United States Patent [19]
Hellman

[11] Patent Number: 5,556,680
[45] Date of Patent: Sep. 17, 1996

[54] COVER BELT FOR A DUCT

[75] Inventor: Lars Hellman, Stockholm, Sweden

[73] Assignee: Ipalco B.V., Netherlands

[21] Appl. No.: 339,117

[22] Filed: Nov. 14, 1994

[30] Foreign Application Priority Data

| Nov. 3, 1993 | [LU] | Luxembourg | 88421 |
| Nov. 19, 1993 | [LU] | Luxembourg | 88427 |

[51] Int. Cl.⁶ .............. B32B 3/10; B32B 3/14; B32B 23/02; F16G 1/04
[52] U.S. Cl. .............. 428/56; 428/54; 428/114; 428/172; 428/193; 428/250; 428/259; 474/266; 474/263
[58] Field of Search .............. 428/114, 172, 428/193, 250, 259, 54, 56; 474/266, 263

[56] References Cited

U.S. PATENT DOCUMENTS

| 3,678,648 | 7/1972 | Leuschner et al. | 53/112 A |
| 4,365,764 | 12/1982 | Marx | 241/101 A |

FOREIGN PATENT DOCUMENTS

| 0107125 | 5/1984 | European Pat. Off. . |
| 2449991 | 9/1980 | France . |
| 2606781 | 5/1988 | France . |
| 7609800 | 3/1976 | Germany . |

*Primary Examiner*—James Withers
*Attorney, Agent, or Firm*—Fishman, Dionne & Cantor

[57] ABSTRACT

A cover belt for a duct is presented, which can be swung up from a closed position by a deflecting device movable in the longitudinal direction of the duct and falls back in its closed position behind the deflecting device. The cover belt is made of a flexibly deformable material with metallic reinforcements. The cover belt is comprised of a securing strip, a joint strip and a cover strip. The securing strip is secured along the duct, the joint strip connects the securing strip flexibly to the cover strip, and the cover strip spans the duct and is supported on both sides of the duct. At least one belt-shaped textile reinforcement layer with essentially the same overall width as the cover belt is embedded in the flexibly deformable material in the area of the neutral plane of the cover belt. First oblong elements of the metallic reinforcement are arranged between the underside of the cover belt and the textile reinforcements so as to extend essentially at right angles to the longitudinal direction over the full width of the cover belt.

18 Claims, 2 Drawing Sheets

COVER BELT FOR A DUCT

BACKGROUND OF THE INVENTION

This invention relates generally to a cover belt for a duct, made of a flexibly deformable material with metallic reinforcements. More particularly, this invention relates to a cover belt for a duct receiving electric cables or busbars for the power supply of a movable energy user, for example, a transporter bridge or quayside crane. This cover belt can be swung up from a closed position by a deflecting device on the movable energy user and then afterwards falls back into its closed position behind this same deflecting device.

The traditional method of feeding electrical power to quayside cranes through contact rails has now virtually been superseded by cable systems. However it is still necessary to provide protection for the cable from quay traffic. Furthermore, safety regulations in many ports require some form of housing. The simplest and most economic method is to provide an open duct, although this is a hazard to pedestrians and can easily become clogged by debris, possibly damaging the cable. A more sophisticated solution is to cover the duct with hinged metal plates. This system however, suffers many drawbacks since maintenance requirements are considerable. Moreover, the complex design of the plate lifting mechanism slows transit speed of the crane.

A semi-flexible cover belt is known in the prior art from DE-A-3005454. A deflecting device on the energy user creates a local opening of the semi-flexible cover belt during movement of the energy user, by twisting the belt by means of deflecting elements on the deflecting device. Behind the deflecting device the belt is again closed by resilient deformation and the belt's own dead weight. A device of this type thus permits unhindered winding and unwinding of an electric cable laid in the duct or, in the case of busbars, unhindered introduction of a current collector into the duct. At the same time the continuous cover belt ensures excellent protection of the cable and/or busbar in the duct against the affects of weather and debris. In addition, unhindered movement of vehicles over the duct is always ensured.

The belt disclosed in DE-A-3005454 consists of a flexibly deformable rubber material in which metallic reinforcements are embedded. It comprises a securing strip, a joint strip and a cover strip. The securing strip is secured along a first longitudinal edge of the duct. The joint strip flexibly connects the securing strip to the cover strip. The cover strip spans the duct and rests on both sides of the duct.

It is quite clear that the design of the reinforcement of the cover belt is a particularly important feature for the proper function of this belt. In a cover belt in accordance with DE-A-3005454, this reinforcement consists of three different layers of metallic reinforcements embedded in the flexibly deformable rubber material. A first layer consists of stranded steel wires near the underside of the belt. These first stranded steel wires run parallel to and across the longitudinal direction of the cover belt over the full width of the cover belt. A second layer likewise consists of stranded steel wires running parallel to and across the longitudinal direction of the cover belt. These second stranded steel wires are arranged exclusively near the topside of the cover strip. A third layer consists of a semi-rigid reinforcement which is provided in the cover strip between the first and second reinforcement.

Excellent results have been achieved with this special reinforcement in practice. The cover strip spanning the duct is dimensionally stable in the transverse direction and always returns to its flat position when closed after twisting during opening, so that its free edge lies flat in a recess at the edge of the duct and is thus protected from traffic passing over the duct. In the longitudinal direction, the cover belt is flexible enough to allow it to be twisted when opened, but at the same time is sufficiently dimensionally stable to prevent development of undulating longitudinal deformation of the cover belt. In the area of the joint strip, the first reinforcing layer ensures the required flexibility and at the same time strength to prevent fractures of the cover belt in this heavily stressed area. The high rigidity achieved by the second and third reinforcing layers, which are arranged exclusively in the area of the cover strip, permits easy support of vehicular traffic and prevents sagging of the cover belt in the area of the cover strip during opening. There is thus no risk that the cover belt could slip off the deflecting device as a result of transverse deformation of the cover strip.

A disadvantage of the otherwise excellent cover belt disclosed in DE-A-3005454 is that tears do occur in the securing strip, particularly when the belt is exposed to extreme loads due to heavy traffic both in weight and in volume.

An attempt was made to strengthen the reinforcing strip of the cover belt in accordance with DE-A-3005454 by adding additional metallic reinforcements. Apart from the fact that the existing material thickness of the cover belt in the area of the reinforcing strip allows very little free space for embedding further metallic reinforcements, it has been discovered that these additional metallic reinforcements have a negative affect on the dimensional stability of the cover belt. In the closed position, the cover strip was no longer in the required flat position. Attempts to strengthen the securing strip by textile reinforcements produced similar negative results in regard to the flat position of the cover belt.

It is clear as a result of the foregoing discussion that despite the many good features of the prior art as disclosed in DE-A-3005454, there is a need to provide a reinforced cover belt which has a securing strip which is much less sensitive to tearing, distortion and/or damage than that of the prior art.

SUMMARY OF THE INVENTION

The above-discussed and other problems and deficiencies of the prior art are overcome or alleviated by cover belt for a duct of the present invention. In accordance with the present invention, this problem is solved by incorporation of at least one belt-shaped textile reinforcement layer, with essentially the same overall width as the cover belt, in the flexibly deformable material in the area of the neutral plane of the cover belt, and by simultaneously arranging first oblong metallic reinforcement elements between the underside of the cover belt and the textile reinforcement, wherein these first oblong metallic reinforcement elements extend essentially at right angles to the longitudinal direction over the full width of the cover belt.

In the cover belt in accordance with the present invention, the securing strip is strengthened by textile reinforcements. The required flat position of the cover belt is, however, not impaired by the textile reinforcements, because the belt-shaped textile reinforcements have essentially the same width as the cover belt and are arranged in the area of the neutral plane of the cover belt (i.e. in the area of the stress-free plane which divides the cover belt into a top and a bottom half, tensile stresses prevailing in the bottom half and compressive stresses in the top half when the topside of the cover strip is loaded). Furthermore, an advantageous interaction between the textile reinforcements and the first metallic reinforcement oblong metallic reinforcement elements occurs in the cover belt in accordance with the present invention. These elements extend essentially at right angles to the longitudinal direction over the full width of the cover belt and ensure the flat position of the cover belt as well as its necessary rigidity and flexibility. Textile reinforcements alone would not provide a satisfactory solution. Cover belts with textile reinforcements which do not have the first metallic reinforcing elements are deformed with time, particularly in warmer climatic zones, and therefore form longitudinal undulations. Consequently the free unsecured edge of the cover belt projects from the recess in the duct edge and the cover belt is likely exposed to the risk that a vehicle wheel will catch in the projecting edge and tear the cover belt.

It is important to emphasize that the task of the first metallic reinforcing elements in accordance with the present invention is essentially to increase the rigidity of the cover belt at right angles to the longitudinal direction and to ensure that after twisting by the deflecting device or after deformation by a vertical load above the duct, the cover belt again assumes its flat position. By contrast, the textile reinforcement in accordance with the present invention essentially increases the tearing strength of the belt, particularly in the transverse direction. In other words, the textile reinforcement in accordance with the present invention contributes to the absorption of shear and tensile stresses in the cover belt. Both reinforcements thus advantageously complement each other.

The risk of tearing the cover belt is greatly reduced particularly in the area of the securing strip by the advantageous interaction of the first metallic reinforcing elements and the textile reinforcements in accordance with the present invention. The metallic reinforcing elements form anchoring points for securing elements traversing the cover belt. By contrast, the textile reinforcements according to the invention prevent the particularly high tensile and shear stresses in this area leading to tears in the flexibly deformable material.

Tests on the cover belt in accordance with this invention have revealed that the function of the joint strip is insignificantly impaired by the special arrangement of the textile reinforcement and the metallic reinforcement. In other words, the loss of flexibility of the joint strip as a result of the textile reinforcement traversing the joint strip surprisingly does not have a negative affect on the function of the cover belt. In the area of the cover strip the textile reinforcement in accordance with this invention even contributes advantageously to greater dimensional stability as a result of its arrangement in the area of the neutral plane.

In a preferred embodiment of the cover belt, at least one textile reinforcement overlaps the ends of the first metallic reinforcing elements. Consequently the risk of damage to the flexibly deformable material is greatly reduced by the ends of the metallic reinforcements. Such cases of local damage to the flexibly deformable material could be starting points for propagation of tears in the base material.

In the area of the cover strip, the cover belt advantageously has second oblong metallic reinforcing elements, which are arranged between the surface of the cover belt and the textile reinforcements and essentially extend at right angles to the longitudinal direction over the full width of the cover strip. The rigidity of the cover strip is further increased in this way without impairment of the flexibility and elasticity of the joint strip. In addition, the flat position of the cover strip is likewise improved.

In the area of the securing strip, the cover belt advantageously has a longitudinal groove to receive a securing bar on its top side. This longitudinal groove essentially extends as far as the upper textile reinforcement in the flexibly deformable material. The contact pressure of the securing bar is thus transmitted directly to the upper textile reinforcement, which in turn has a favorable affect on the prevention of tears in this area.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
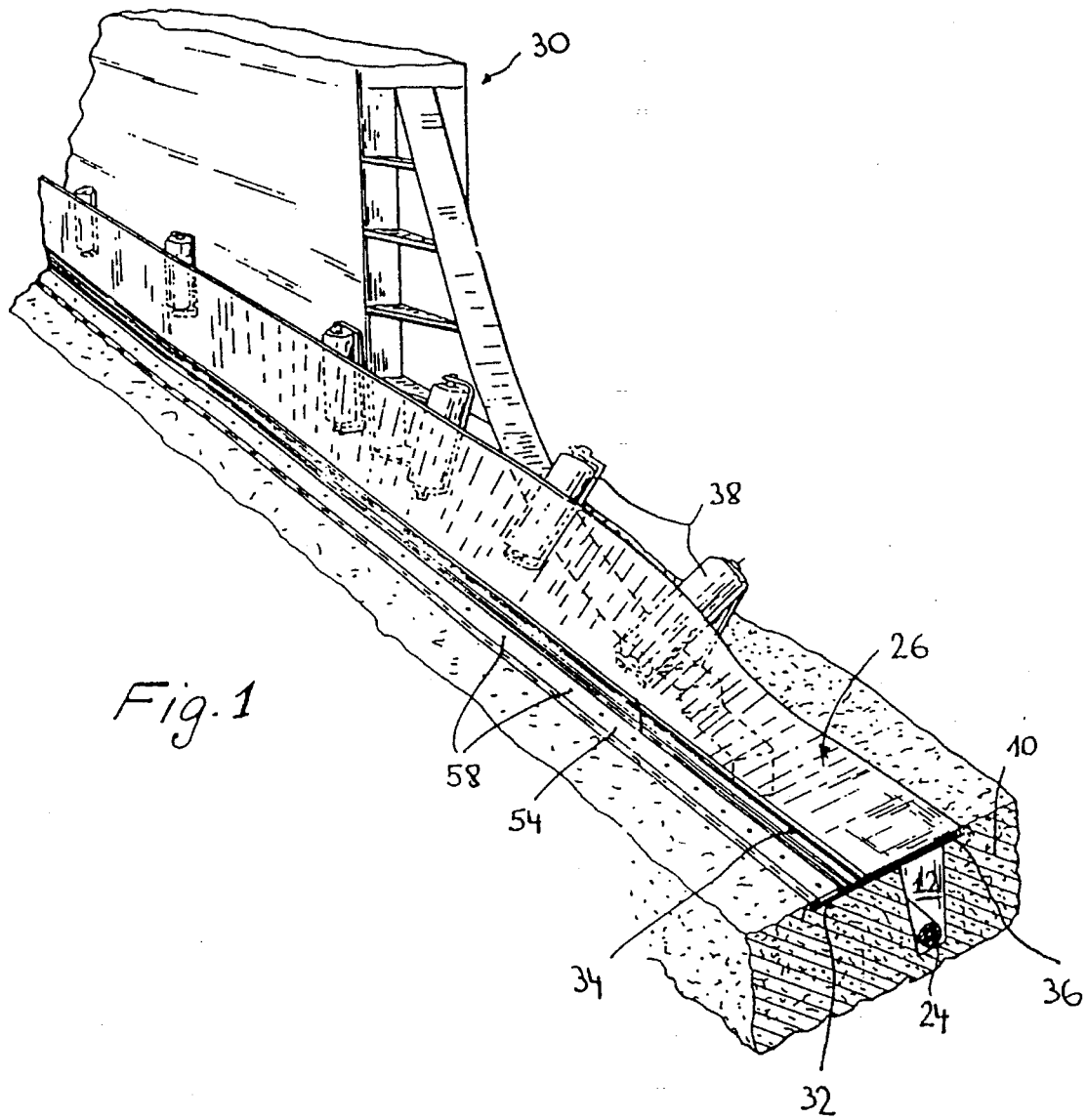
FIG. 1 shows a perspective view of a duct with a cover belt according to the invention and a deflecting device for the cover belt.

Referring first to FIG. 1, the cover belt for a duct of the present invention is shown generally at 26.

Figure 2:
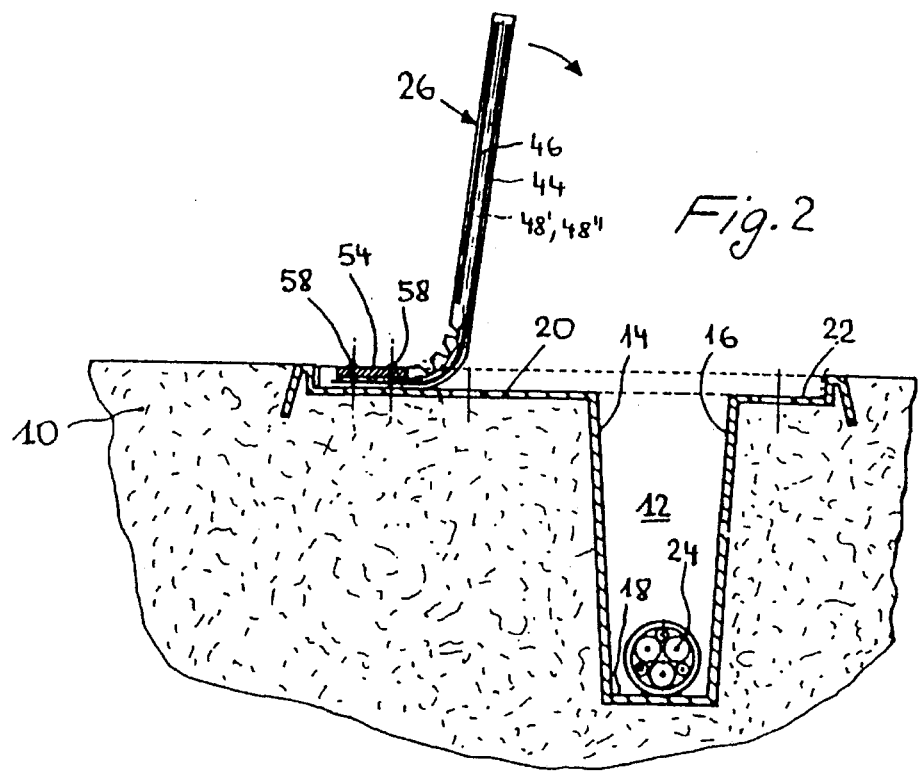
FIG. 2 shows a cross-section through the duct with a cover belt as in FIG. 1 (the deflecting device is not shown)

With reference now to FIG. 2 which shows a cross-section through a U-shaped duct 12 in the ground 10, the duct 12 has two opposite, essentially vertical side walls 14 and 16 and a bottom 18. A recess 20, 22 is provided along each of the two longitudinal edges of the duct 12 for receiving a cover belt 26. The reference number 24 denotes an electric cable in the duct 12.

FIG. 1 shows a deflecting device 30, which is movable in the longitudinal direction of the duct 12 and opens the cover belt 26 locally by twisting. Such a deflecting device, known in the art, can be mounted, for example, on a transporter bridge or a quayside crane. The local opening of the cover belt 26 in the area of the deflecting device 30 provides unrestricted access to the duct 12 in this local area, whereas the remainder of the duct 12 continues to be protected by the cover belt 26 in the closed position.

The cover belt 26 itself consists of a belt made of a flexibly deformable material 28, for example rubber. This belt, which is essentially wider than the opening in the duct 12, can be functionally subdivided into three sections or strips across its width (see FIG. 3). A securing strip 32 along the first longitudinal edge of the belt serves to secure one side of the cover belt in the recess 20 alongside the duct 12. A joint strip 34 adjoins the securing strip 32 and connects the securing strip 32 to a cover strip 36.

In the closed position the joint strip 34 and a large part of the cover strip 36 lie flat on the recess 20. The remaining part of the cover strip 36 spans the opening of the duct 12 and rests flat on the surface of the recess 22 on the other side (see also FIG. 1). The cover belt 26 is opened from its closed position by continuous twisting until the cover strip 36 is virtually vertical, as shown in FIG. 1. This twisting of the cover belt 26 is achieved through rolls 38 on the deflecting device 30. The cover belt is returned into its closed position behind the deflecting device 30 by flexible deformation and by the dead weight of the cover belt 26. It should be pointed out that the front part of the deflecting device 30 with the inclined rolls 38 can be dispensed with for better access to the duct 12. The cover belt 26 is then supported exclusively by the rear almost vertical rolls.

Figure 3:
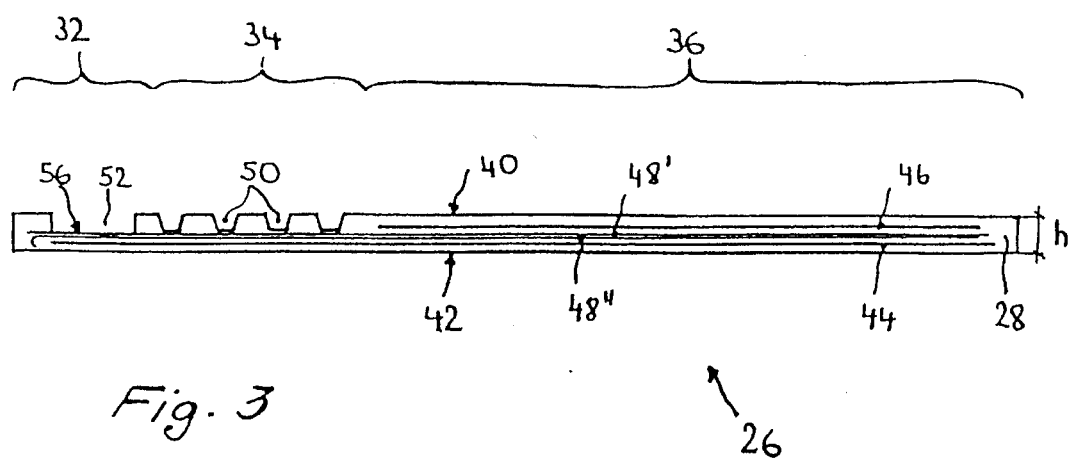
FIG. 3 shows a cross-section on an enlarged scale through a cover belt according to the present invention.

Further design features of the cover belt in accordance with the present invention are explained in more detail with reference to FIG. 3. The cover belt 26 has a material thickness "h" between its top side 40 and underside 42, which is slightly smaller than the depth of the recesses 20 and 22 at the duct edge, so that the cover belt 26 is slightly countersunk in relation to the ground surface. Several reinforcing layers are embedded in the flexibly deformable material 28 so as to overlap each other.

A first reinforcing layer consists of oblong metallic reinforcing elements 44, which are embedded in the flexibly deformable material 28 in the area of the underside 42. These first metallic reinforcing elements 44 (e.g. stranded steel wires) extend at right angles to the longitudinal direction of the cover belt over the full width of the cover belt, so that they are supported on both sides by the duct 12 when the cover belt is in the closed position. Their function is to impart the necessary dimensional stability, rigidity and also elasticity to the cover belt, so that:

(1) the cover belt is as flat as possible in the closed position;

(2) after twisting during opening, the cover belt 26 returns to its flat closed position, (3) with vertical loading of the cover strip 36 above the duct, the cover belt is not greatly deformed, and (4) this deformation is largely reversible.

The distance between the individual first metallic reinforcing elements 44, their thickness, their flexible properties, etc. should, of course, be determined by the person skilled in the art as a function of the predetermined load and the dimensions of the cover belt.

A second reinforcing layer consists of oblong, metallic reinforcing elements 46 (e.g. stranded steel wires), which are integrated in the flexibly deformable material in the area of the top side 40 of the cover strip 36. These second metallic reinforcing elements 46 likewise extend at right angles to the longitudinal direction of the cover belt 26, but only over the width of the cover strip 36 and do not engage in the joint strip 34. The function of this second reinforcing layer 46 is primarily to increase the rigidity and dimensional stability of the cover strip 36, without impairing the flexibility of the joint strip 34.

To increase the tearing strength of the securing strip, i.e. to make the securing strip more resistant to tensile and shear stresses, the cover belt 26 also has two textile reinforcement layers 48' and 48". Reinforcement layers 48' and 48" each form a belt with approximately the same width as the cover belt 26 and are arranged one above the other in the area of the neutral plane of the cover belt 26. The textile reinforcements may, for example, be fabric reinforcements made of low-extension polyester fibers in the longitudinal direction and more extensible polyamide fibers in the transverse direction. The bottom textile reinforcement 48" advantageously overlaps the ends of the first metallic reinforcing elements 44 in the area of the securing strip 32, in order to protect the flexibly deformable material 28 against damage by these usually sharp-edged ends of the reinforcing elements 44.

The joint strip 34 has several recesses 50 on the top side 40, which run parallel to each other in the longitudinal direction of the cover belt and facilitate the twisting and bending of the joint strip. The cross-section of these recesses is advantageously trapezoidal. The depth of the recesses 50 is preferably adapted in such a way that the relation to the position of the upper textile reinforcement 48' maintains continuity of the flexibly deformable material 28 above the upper textile reinforcement 48'.

The securing strip 32 preferably has a recess 52 for a securing bar 54 on the top side 40. The depth of this recess 52 is selected in such a way that the securing bar 54 transmits the contact pressure essentially directly to the top side 56 of the upper textile reinforcement 48'. The required contact pressure of the securing bar 54 is achieved by securing elements 58 (e.g. screws or preferably blind rivets), which traverse the cover belt at right angles in the area of the recess 52. These securing elements 58 additionally form anchoring points for the first reinforcing elements 44 of the cover belt 26.

Initial tests have demonstrated that the described cover belt 26 in accordance with the present invention has functional properties at least as good as the cover belt from DE-PS-3005454, but is substantially more wear-resistant than the cover belt of DE-PS-3005454. So far no tears have been detected in the securing strip in the tests. Therefore, the cover belt in accordance with the present invention is a vast improvement over the prior art. In addition, when maintenance costs and down time are added into the equation, costs of the cover belt in comparison to the prior art are reduced substantially.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A cover belt of a flexibly deformable material for a duct, having a width and a longitudinal direction, an underside facing the duct, an opposed topside and a neutral plane defined between said underside and said topside, said cover belt comprising:

(1) a lateral securing strip for securing the cover belt along a duct;

(2) a cover strip for covering a duct, said cover strip width being sufficient to span the duct and be supported on both sides of the duct;

(3) a joint strip flexibly connecting said securing strip to said cover strip;

(4) the combined widths of each of said lateral securing strip, and said joint strip and said cover strip constituting substantially the full width of said cover belt; and (5) reinforcements embedded in said cover belt, said reinforcements including:

(a) at least one fabric reinforcing layer in said cover belt, said fabric reinforcing layer being embedded in said cover belt in the area of the neutral plane of said cover belt and extending in the longitudinal direction of the belt over substantially the full width of said cover belt, and (b) at least one layer of metallic reinforcing elements transverse to the longitudinal direction of said cover belt, said reinforcing elements being between the underside of said cover belt and said fabric reinforcing layer and extending over substantially the full width of said cover belt.

2. The cover belt of claim 1, wherein at least one fabric reinforcing layer overlaps the ends of said first metallic reinforcing elements in said securing strip.

3. The cover belt of claim 1, wherein said reinforcements further include:

a second layer of metallic reinforcing elements arranged between the top side of the cover belt and said at least one fabric reinforcing layer and extending essentially at right angles to the longitudinal direction of the cover belt over the full width of said cover strip to said joint strip.

4. The cover belt of claim 1, comprising:

a longitudinal groove in said securing strip for receiving a securing bar, said longitudinal groove extending into said securing strip to said at least one fabric reinforcement layer in the flexibly deformable material.

5. The cover belt of claim 1 comprising:

recesses in said joint strip above said at least one textile reinforcement layer, the depth of these recesses in said joint strip being limited so that the continuity of the flexibly deformable material above said at least one textile reinforcement layer is not interrupted.

6. The cover belt of claim 1 wherein:

said metallic reinforcing elements are oblong reinforcing elements.

7. The cover belt of claim 3 wherein:

said one layer of metallic reinforcing elements are oblong reinforcing elements; and said second layer of metallic reinforcing elements are oblong reinforcing elements.

8. The cover belt of claim 4, including:

a second fabric reinforcing layer in said cover belt, said second reinforcing layer being in the area of the neutral plane of said cover belt and being between said first fabric reinforcing layer and said topside of said cover belt and extending over substantially the full width of said cover belt.

9. A cover belt of a flexibly deformable material for a duct, having a width and a longitudinal direction, an underside facing the duct, an opposed topside and a neutral plane defined between said underside and said topside, said cover belt comprising:

(1) a lateral securing strip for securing the cover belt along a duct;

(2) a cover strip for covering a duct, said cover strip width being sufficient to span the duct and be supported on both sides of the duct;

(3) a joint strip flexibly connecting said securing strip to said cover strip;

(4) the combined width of said securing strip, said joint strip and said cover strip constituting substantially the full width of the cover belt; and (5) reinforcements embedded in said cover belt, said reinforcements including:

(a) a lower layer of first metallic reinforcing elements transverse to the longitudinal direction of said cover belt, (b) an upper layer of second metallic reinforcing elements transverse to the longitudinal direction of said cover belt, and (c) at least one fabric reinforcing layer in said cover belt between said upper and lower layers of metallic reinforcing elements, said at least one fabric layer extending over substantially the full width of the cover belt.

10. The cover belt of claim 9, wherein:

said lower layer of metallic reinforcing elements extends over substantially the full width of the cover belt; and said at least one fabric reinforcing layer extends over substantially the full width of said cover belt in the area of the neutral plane of the cover belt.

11. The cover belt of claim 9, wherein:

said lower layer of first metallic reinforcing elements comprises oblong metallic reinforcing elements extending over substantially the full width of said cover belt; and said upper layer of second metallic reinforcing elements comprises oblong metallic reinforcing elements extending over essentially the full width of said cover strip.

12. The cover belt of claim 9, wherein:

said at least one fabric reinforcing layer extends over substantially the full width of said cover belt in the neutral plane of said cover belt.

13. The cover belt of claim 12, including:

a second fabric reinforcing layer in said cover belt, said second fabric reinforcing layer extending over substantially the full width of said cover belt.

14. The cover belt of claim 9, including:

a second fabric reinforcing layer in said cover belt, said second fabric reinforcing layer extending over substantially the full width of said cover belt.

15. The cover belt of claim 14, wherein:

said second fabric reinforcing layer is between said at least one fabric reinforcing layer and said upper layer of second metallic reinforcing elements, and wherein said at least one fabric reinforcing layer overlaps the ends of the metallic reinforcing elements of said lower layer of first metallic reinforcing elements in said securing strip.

16. The cover belt of claim 9, including:

a longitudinal groove in the top side of said securing strip for receiving a securing bar.

17. The cover belt of claim 16, wherein:

said longitudinal groove extends into said securing strip to the top of said at least one fabric reinforcing layer.

18. The cover belt of claim 9, including:

a plurality of longitudinal recesses in said joint strip above said at least one fabric reinforcing layer, the depth of said longitudinal recesses being limited so that the continuity of the flexibly deformable material above said at least one textile reinforcement layer is not interrupted.

* * * * *

UNITED STATES PATENT AND TRADEMARK OFFICE
CERTIFICATE OF CORRECTION

PATENT NO. : 5,556,680
DATED : September 17, 1996
INVENTOR(S) : Lars Hellman

It is certified that error appears in the above-indentified patent and that said Letters Patent is hereby corrected as shown below:

Title page, item [30], under Foreign Appliction Priority Data, line 1, delete Nov. 3, 1993    [LU]    Luxembourg..........88421

Signed and Sealed this

Eleventh Day of March, 1997

Attest:

BRUCE LEHMAN

*Attesting Officer*     *Commissioner of Patents and Trademarks*